(12) United States Patent
Iwase et al.

(10) Patent No.: US 6,469,844 B1
(45) Date of Patent: Oct. 22, 2002

(54) LENS HOLDING METHOD AND LENS HOLDER

(75) Inventors: Kazuhito Iwase, Kanagawa; Hisashi Tasaka, Saitama, both of (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/585,274

(22) Filed: Jun. 2, 2000

(30) Foreign Application Priority Data

Jun. 2, 1999 (JP) .......................................... 11-155741

(51) Int. Cl.7 ................................................. G02B 7/02
(52) U.S. Cl. ...................................................... 359/819
(58) Field of Search ......................... 359/819; 396/529, 396/530, 533

(56) References Cited

U.S. PATENT DOCUMENTS

| | | | |
|---|---|---|---|
| 4,957,341 A | 9/1990 | Hasegawa | .................. 359/819 |
| 5,768,649 A | 6/1998 | Pearson | ...................... 396/529 |
| 6,055,111 A | 4/2000 | Nomura et al. | ............. 359/642 |
| 6,208,808 B1 | 3/2001 | DiRisio | .......................... 396/6 |

FOREIGN PATENT DOCUMENTS

| | | | |
|---|---|---|---|
| JP | 10-326504 A | 12/1998 | ............ F21M/3/02 |

Primary Examiner—Ricky Mack
(74) Attorney, Agent, or Firm—Young & Thompson

(57) ABSTRACT

A lens element, that is guided along a tapered wall of a lens holder and slipped into the lens holder, is fixedly held on a lens support collar at a bottom of the lens holder by thermally deforming fixing claws of the lens holder so as to grasp the outer periphery of the lens element. The fixing claws are arranged in diametrically symmetrical positions with respect to a center axis of the lens holder so as to align the optical axis of the lens element and the center axis of the lens holder.

5 Claims, 5 Drawing Sheets

LENS HOLDING METHOD AND LENS HOLDER

BACKGROUND OF THE INVENTION

1. Field of the Invention

The present invention relates to a lens holding structure for holding a lens element that is incorporated in an optical instrument such as a camera and the like, and a lens holder for incorporating a lens element in an optical instrument by means of the lens holding structure.

2. Description Related to the Prior Art

Typically, a variety of lens-fitted film units have been popular for the purpose of easily enjoying photography without using ordinary cameras. Such a lens-fitted film unit, after exposure of the maximum number of exposures available on a filmstrip thereof, is simply given to a photofinisher who first removes a film cassette with the filmstrip from the lens-fitted film unit and develops the negatives and then forwards the unit body to the manufacturer for recycling. In recent years, in light of the protection of the environment and the reduction of industrial waste, various efforts are focused on how to increase the ratio of recycling of waste lens-fitted film unit. Unit bodies of the waste lens-fitted film units recovered from photofinishers are disassembled into front and rear covers and base members for recycling by melting them and then forming resin pellets or by cleaning and reusing them as they are after quality examination.

Lens-fitted film units and cheap compact cameras generally include injection-molded resin products for the majority of the parts that are employed for the purpose of cost down. Injection molding, in which a melted resin material is injected into a mold having a cavity in conformity with a product with a high pressure and then cooled and converted into a solid product, is suitable for mass production with an effect of lowering production costs. A taking lens and a lens holder for holding the taking lens that are incorporated in a cheap camera are provided in the form of molded resin products and fixedly installed in the camera by means of fixing claws.

Installing the lens element to the lens holder by means of the fixing claws needs at least one lens retaining member, which is one of causes of hindrance to lowering manufacturing costs. Further, in order to assemble the lens retaining member to the lens holder by means of the fixing claws, the lens holder or the lens retaining member has to be formed with holes for receiving the fixing claws due to structural necessity, which causes a decrease in structural strength of the lens holder and, in consequence, is undesirable in terms of quality. Further, the lens holder is able to thermally deform, so that the lens element is possibly brought into axially unaligned position in high temperature circumstances.

Although it can be thought to eliminate the use of fixing claws for holding a lens element on a lens holder, the lens element that has been caulked to the lens holder once is hardly removable from the lens holder, which makes it hard to reuse the lens element. In order to increase recycling efficiency, it is desirable to employ a number of reusable parts and a lens holding structure that allows the lens element to be easily removed and reused. Further, the conventional lens holding structure possibly causes uneven distribution of holding force exerted on the lens element with an adverse effect of producing deformation of the lens element, which is always undesirable for image quality.

SUMMARY OF THE INVENTION

An object of the present invention is to provide a method of lens holding structure which eliminates the necessity of lens retaining member and a method of fixing a lens element to a lens holder by means of the lens holding structure.

Another object of the present invention is to provide a lens holding structure which allows a lens element to be easily disassembled from a lens holder for recycling.

The above objects of the present invention are achieved by a method of fixing a lens element to a plastic lens holder comprising a cylindrical shell having an inner diameter greater than an outer diameter of the lens element, a lens support annular collar formed as an integral part at the bottom of the cylindrical shell for supporting the lens element slipped into the cylindrical shell and a plurality of thermally deformable fixing claws, which comprises the steps of slipping the lens element into the cylindrical shell until the lens element is supported on the lens support annular collar, pressing a heating tool against said fixing claws of the cylindrical shell from a top, and heating and deforming said fixing claws of the cylindrical shell so as to grasp a periphery of the lens element with the deformed parts of the cylindrical shell. The fixing claw is shaped and has a top surface inclined inward up so as to be thermally deformed even with the periphery of the lens element.

The plastic lens holder comprises a cylindrical shell, a lens support annular collar that is integrally formed at a bottom of the cylindrical shell and supports the lens element slipped into the cylindrical shell, and a plurality of fixing claws integrally formed with and axially extending from the cylindrical shell, the fixing claws being arranged in diametrically symmetrical positions with respect to a center axis of the cylindrical shell. The fixing claws are thermally deformed in a radial direction so as to grasp a periphery of the lens element, thereby fixing the lens element to the plastic lens holder. The cylindrical shell may be further provided with a guide wall extending between each adjacent the fixing claws and axially beyond the fixing claw. wherein the guide wall The lens holder may further comprising grooves formed in the cylindrical shell for allowing access of a removing tool to an under side of the lens element for removal of the lens element from the lens holder.

BRIEF DESCRIPTION OF DRAWINGS

The above and other objects and features of the present invention will be more clearly understood from the following detailed description in connection with a preferred embodiment thereof when reading in conjunction with the accompanying drawings, in which.

DETAILED DESCRIPTION OF THE INVENTION

Figure 1:
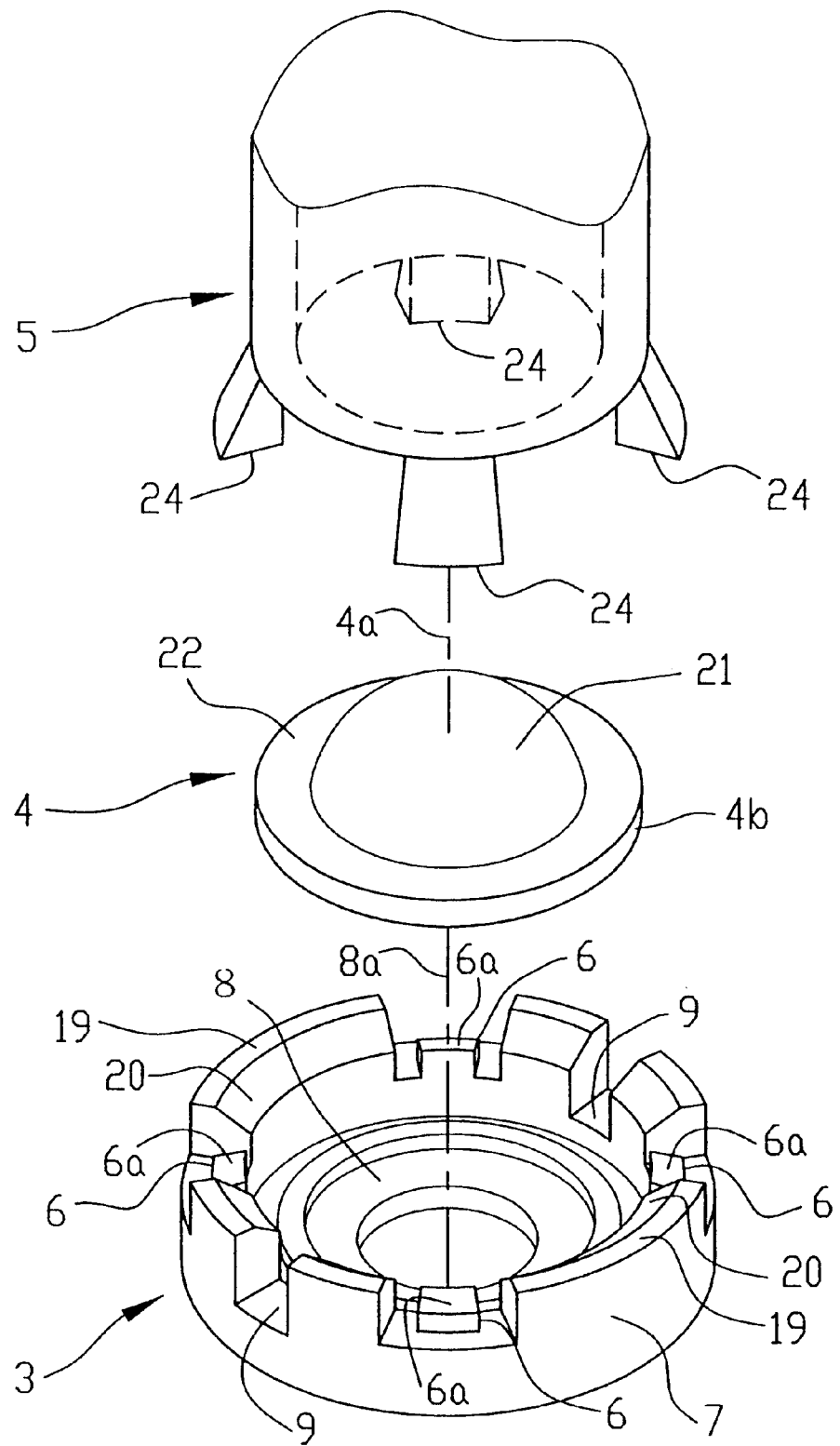
FIG. 1 is an explanatory perspective view showing a lens holding structure for holding a lens element in a lens holder by means of a caulking tool in accordance with the present invention.

Referring to the drawings, and, in particular, to FIG. 1 which shows a process of installing a lens element 4 into a lens holder 4 of a main body 11 of a lens-fitted film unit, the main body semi-assembly 11 is provided with parts and mechanisms necessary for making exposure and advancing a filmstrip. The lens holder 3 is formed as an integral part of a housing cover 12 of a shutter unit housing that is installed and fixed to a front center section of the main body semi-assembly 11. A taking lens which comprises a single lens element 4 by way of example is slipped into the lens holder 3. After holding the lens element 4 in the lens holder 3, the main body semi-assembly 11 is loaded with a film cartridge and then covered by front and rear covers (not shown) to form a light-tight casing. A decorative cardboard cover is attached to the light-tight casing to complete a lens-fitted film unit.

Figure 2:
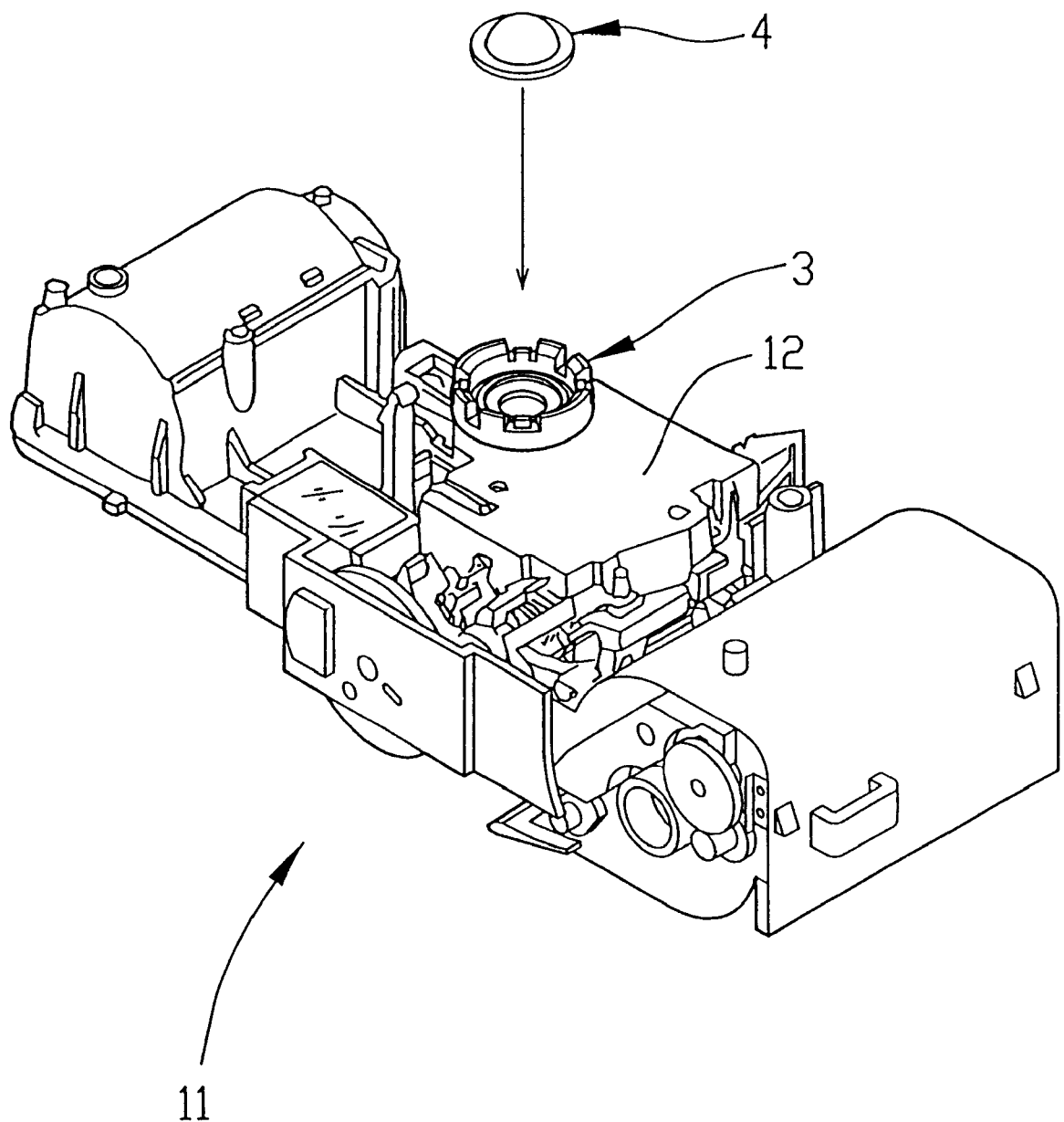
FIG. 2 is a perspective view of a main body of a lens-fitted film unit to which a lens holder in accordance with a preferred embodiment of the invention is installed.
Figure 3A:
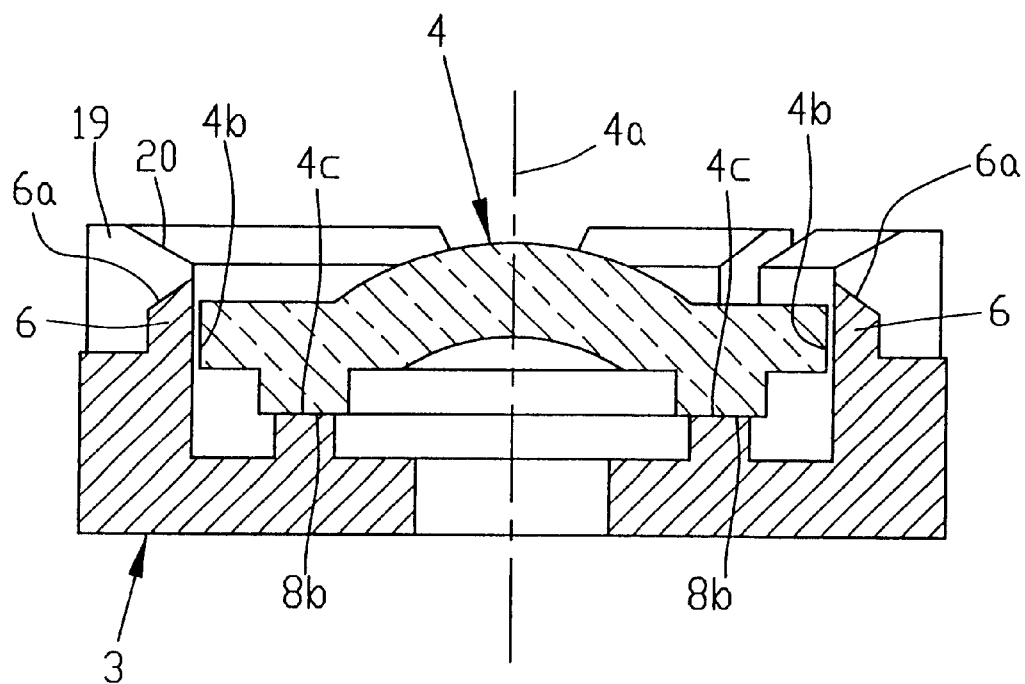
FIG. 3A is an explanatory cross-sectional view showing the positional relationship between the lens holder and the lens element before assembling.
Figure 3B:
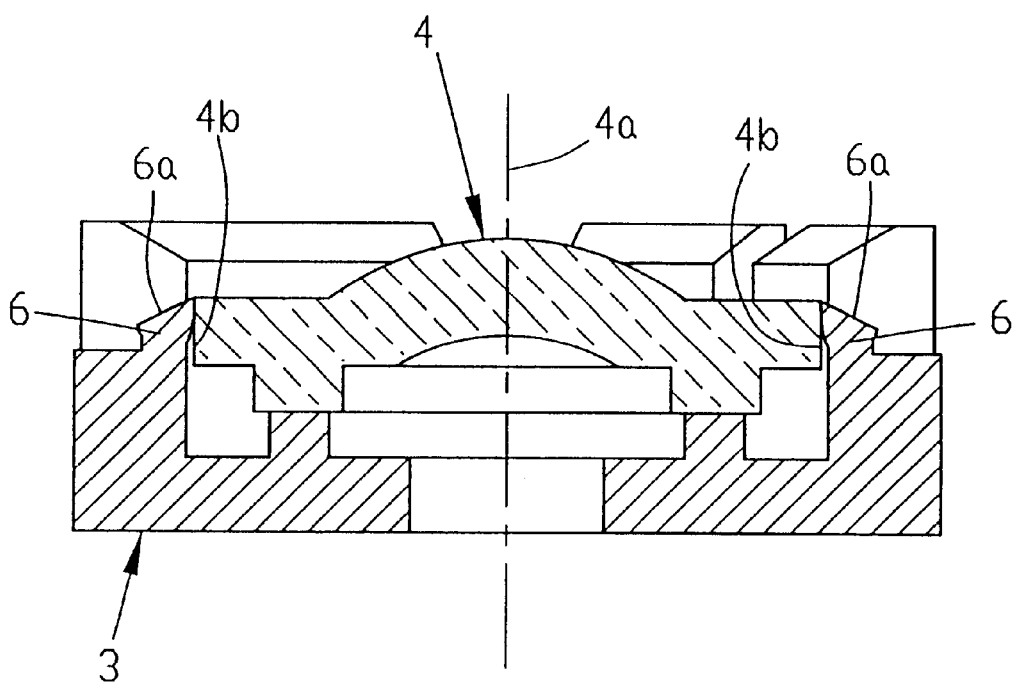
FIG. 3B is an explanatory cross-sectional view showing the positional relationship between the lens holder and the lens element after assembling.

Referring to FIGS. 2, 3A and 3B showing how to hold the lens element 4 in the lens holder 3, the lens element 4, which comprises a positive power injection-molded resin lens and has a convex front surface 21, is slipped into the lens holder 3 of the main body semi-assembly 11. The lens element 4 has a convex front surface 21 and is formed with an annular flat flange 22 and cylindrical flange 4c as an integral part thereof which is perpendicular to an optical axis 4a of the lens element 4. On the other hand, the lens holder 3, which is formed as an integral part of the shutter housing cover 12 (see FIG. 2), comprises a cylindrical shell 7 and a lens support annular collar 8 as an integral part thereof for supporting the lens element 4 at the annular flange 4a thereon. The cylindrical shell has an internal diameter slightly larger than an outer diameter of the annular flange 4a of the lens element 4 so as to support the outer periphery 4b of the annular flat flange 22. The lens support annular collar 8 is formed with a cylindrical flange 8b having a shape in conformity with the shape of the cylindrical flange 4c of the lens element 4 for supporting the lens element 4 from the under side. The cylindrical shell 7 is formed with an even number of, for example four in this embodiment, fixing claws 6a which are arranged with regular separations, in other words each pairs of which are arranged diametrically opposite to each other. Each of the fixing claws 6a projects from an axial groove 6 formed in the cylindrical shell 7 and adjacent to the lens support annular collar 8 so as to extend parallel to the optical axis 4a of the lens element 4. The cylindrical shell 7 is further formed with a groove 9 at the middle between each adjacent fixing claws 6. Each of the groove 9 is shaped so as to receive jaws 33 (see FIG. 5) of a disassembling tool which will be described later and has a depth so as to open the whole thickness of the outer periphery 4b of the annular flat flange 22 when the lens element 4 is placed within the lens holder 3 and supported on the cylindrical flange 8b of the lens support annular collar 8. Axially extending guide walls 19 between the respective adjacent grooves 6 and 9 of the lens holder 3 guide the lens element 4 when receiving it therein. The guide wall 19 is formed with a radially tapered guide edge 20 so as to direct and guide the lens element 4 into the lens holder 3 even when the lens element 4 is slipped with the optical axis 4a offset from an axis 8a of the lens holder 3.

After the lens element 4 having been slipped in the lens holder 3 and situated in position on the lens support annular collar 8, a manipulator (not shown) lowers a caulking tool 5 having heating feet 24 so as to bring the heating feet 24 into abutment with the fixing claws 6a of the lens holder 3, respectively. The heating feet 24 thermally deform the fixing claws 6a and press the deformed fixing claws 6a against the outer periphery 4b of the annular flat flange 22 of the lens element 4. Specifically, the heating foot 24 at its under side has an upward inclined surface directed to the optical axis 4a of the lens element 4. When applying a current to the heating feet 24 for a predetermined period of time, the heating feet 24 heat the fixing claws 6. As a result, the fixing claws 6 deform and bulge inward to hold tightly the lens element 4.

Figure 4:
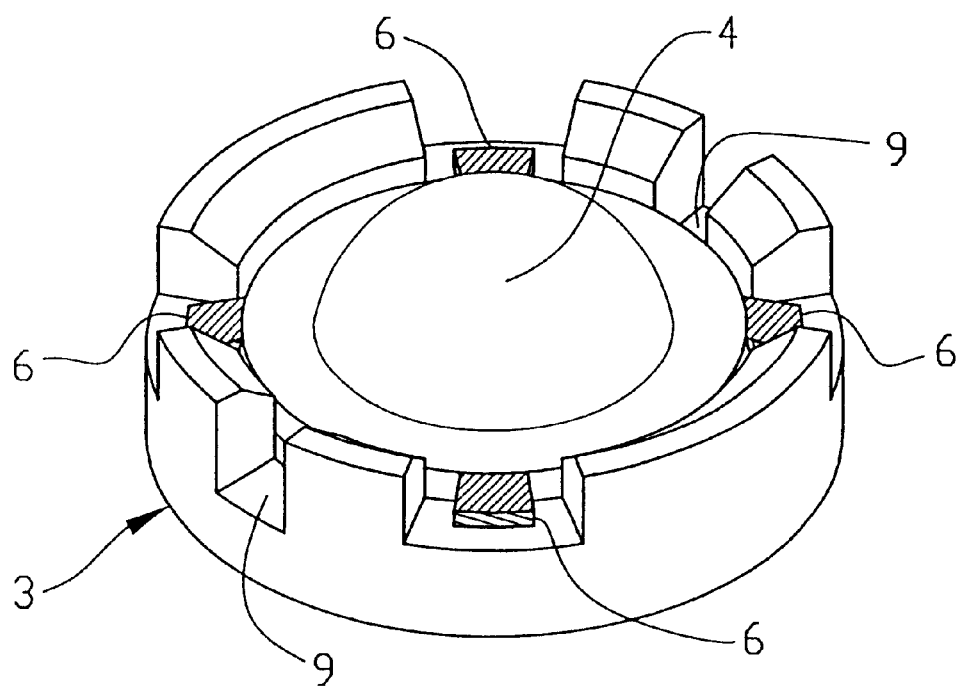
FIG. 4 is a perspective view of the lens holder with the lens element caulked thereto.

As shown in FIGS. 3A and 3B, in practical assembling operation, the lens element 4 is automatically assembled to the main body semi-assembly 11 at a lens assembling station in an automatic assembling line. When the main body semi-assembly 11, which is placed on a conveyer (not shown) with the front surface faced up, is transported to the lens assembling station, a robot hand (not shown) picks up the lens element 4 and slips it into the lens holder 3. Specifically, the lens element 4 is first caught on the walls 19 and guided along the radially tapered guide edges 20 with its own weight, so as to be situated on and supported in position by the lens support annular collar 8 with the optical axis 4a in alignment with the center axis 8a of the lens support annular collar 8 as shown in FIG. 3A. At this time, the lens support annular collar 8 places the lens element 4 in a predetermined axial position through abutment between the cylindrical flange 4c of the lens element 4 and the cylindrical flange 8b of the lens support annular collar 8. In this position, there is left a slight gap between the outer periphery 4b of the annular flat flange 22 of the lens element 4 and the cylindrical shell 7 of the lens holder 3. Subsequently, the manipulator lowers the caulking tool 5 to bring the heating feet 24 into abutment with the fixing claws 6a so as to heat and deform them. Although the caulking tool 5 comes down parallel to the center axis 8a of the lens support annular collar 8, the foot 24 and the fixing claw 6a have surfaces inclined oppositely to each other, the foot 24 exerts a radial component of a force on the fixing claw 6a and thermally deforms the fixing claw 6a against the outer periphery 4a of the lens support annular collar 8. As a result, the fixing claws 6a grasp the lens support annular collar 8 and hold the lens element 4 as shown in FIG. 3B. When the fixing claws 6a are cooled, the lens holder 3 fixedly holds the lens element 4 without accompanying radial offset and axial inclination as shown. in FIG. 4.

Figure 5:
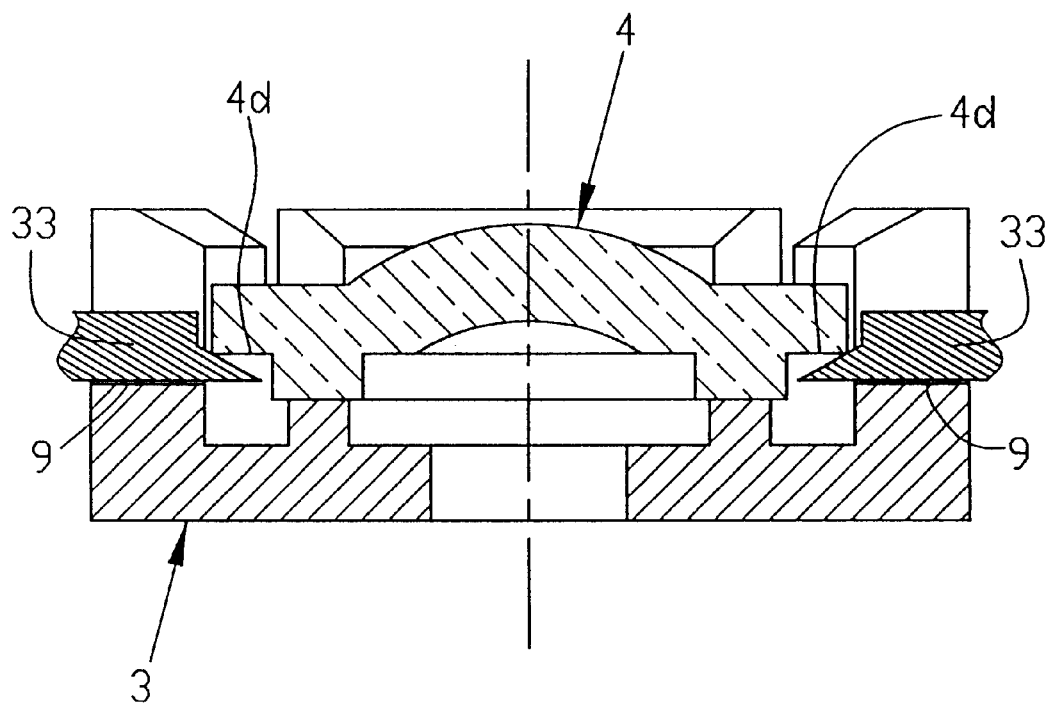
FIG. 5 is an explanatory cross-sectional view showing the positional relationship between the lens holder with the lens element and a disassembling tool.

FIG. 5 shows how to disassemble the lens element 4 from the lens holder 3 of a used lens-fitted film unit for reuse. As shown in FIG. 5, when the main body semi-assembly 11 collected by the manufacturer is fixedly put on a working stage (not shown), a manipulator (not shown) moves removing fingers 33 in opposite radial directions for access to the annular flat flange 22 of the lens element 4 through the grooves 9 and then insert them into gaps between the annular flat flange 22 of the lens element 4 and bottom of the grooves 9, respectively. Subsequently, the manipulator moves upward the removing fingers 33 in a direction parallel to the optical axis 4a until the lens element 4 is removed from the lens holder 3. At this time, since the lens element 4 is held with fixing force that is radially applied against the annular flat flange 22 by to the fixing claws 6a, in order to remove the lens element 4 from the lens holder 3, it is not necessary to apply so strong axial force to the lens element 4.

Figure 6A:
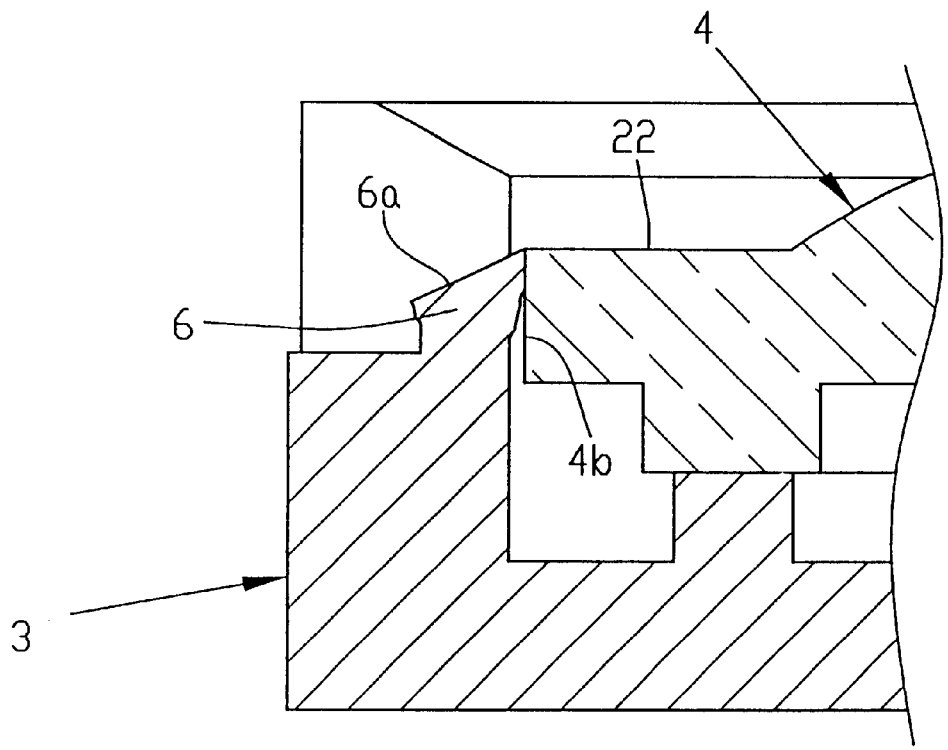
FIGS. 6A and 6B are cross-sectional views showing details of fixing claws for caulking the lens element to the lens holder.
Figure 6B:
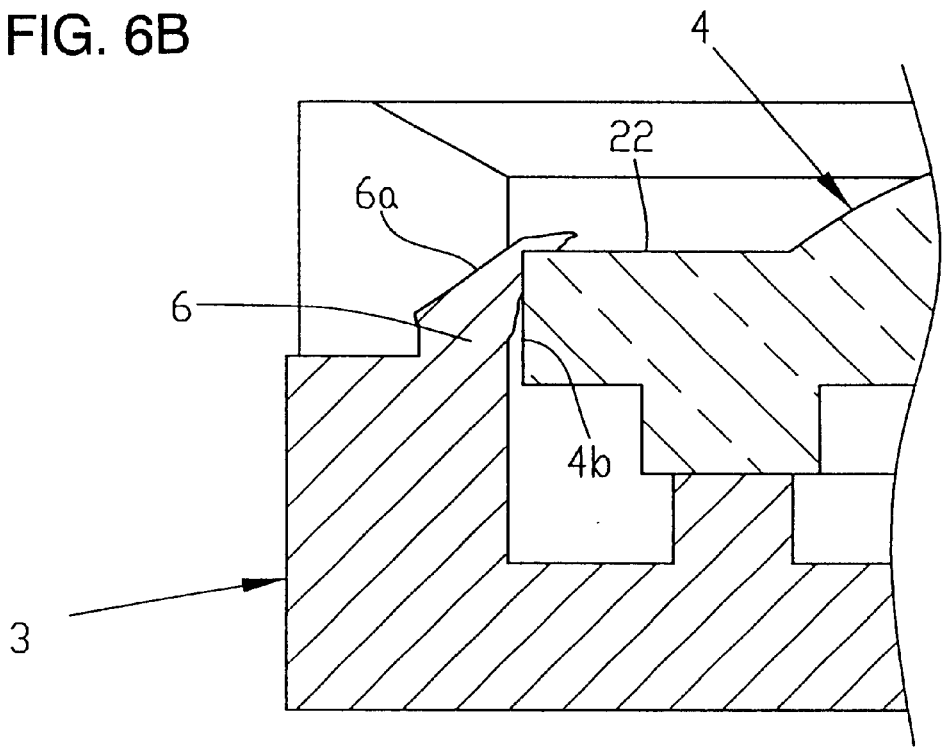

One of common problems that possibly occurs in the process for fixing the lens element 4 to the lens holder 3 by heating and deforming the fixing claws 6a so as to grasp the annular flat flange 22 of the lens element 4 is disparity in deformation of the fixing claws 6a which depends upon manufacturing variation in shape of the fixing claws 6a. In the ideal state of deformation, the fixing claw 6a at its tip does not project across the edge of the annular flat flange 22 but extends even with the annular flat flange 22 as shown in FIG. 6A. However, the fixing claw 6a possibly irregularly deforms to project across the edge of the annular flat flange 22 according to caulking conditions such as pressure against the fixing claw 6a, a time for which a current is applied to the heating feet 24 of the caulking tool 5, a relative angle between the abutment surfaces of the heating foot 24 and the fixing claw 6a and the like as shown in FIG. 6B. However, even if there occurs irregular deformation of the fixing claws 6a, the amount of projection across the edge of the annular flat flange 22 is too small to arrest the removal of the lens element 4 from the lens holder 3.

As apparent from the above description, a plurality of fixing claws of the lens holder are heated and deformed to firmly grasp the outer periphery of the lens element so as thereby to fixedly hold the lens element in the lens holder. The lens holder having guide walls formed with tapered edges avoids unsuccessfully receiving a lens element slipped into the cylindrical shell by means of a robot hand, which is always desirable for improving adaptability of the lens holder to automatic assembly. The lens holder formed with access grooves makes it easy to remove the lens element from the lens holder and, in consequence, surpasses in reusability. The lens holding structure that has no necessity of using a lens retaining member surpasses in manufacturing costs. Furthermore, since the lens holding structure grasps the lens element not in an axial direction but in radial direction, there is no mechanical and thermal deformation in the lens element, which is essential to maintain optical characteristics of the lens element.

The lens holding structure of the present invention can be employed in various types of hand camera and other optical instruments as well as the lens-fitted film unit.

It is to be understood that although the present invention has been described in detail with regard to a preferred embodiment thereof, various other embodiments and variants may occur to those skilled in the art, which are within the scope and spirit of the invention, and such other embodiments and variants are intended to be covered by the following claims.

What is claimed is:

1. A method of fixing a lens element to an integral plastic lens holder which comprises a cylindrical shell having an inner diameter greater than an outer diameter of the lens element, a lens support annular collar formed at the bottom of said cylindrical shell for supporting said lens element put in said cylindrical shell and a plurality of thermally deformable fixing claws, said method comprising the steps of:

slipping the lens element into said cylindrical shell until the lens element is supported on said lens support annular collar;

pressing a heating tool against said fixing claws of said cylindrical shell from a top; and heating and deforming said fixing claws of said cylindrical shell until said fixing claws become even with said outer periphery of said lens element so as to grasp an outer periphery of said lens element by deformed said fixing claws.

2. A method of fixing a lens element into a plastic lens holder as defined in claim 1, wherein said fixing claw has a top surface inclined inward up.

3. A plastic lens holder for fixedly holding a lens element, said plastic lens holder comprising:

a cylindrical shell;

a lens support annular collar that is integrally formed at a bottom of said cylindrical shell and supports said lens element slipped into said cylindrical shell;

a plurality of fixing claws integrally formed with and axially extending from said cylindrical shell, said fixing claws being arranged in diametrically symmetrical positions with respect to a center axis of said cylindrical shell; and a guide wall integrally formed with said cylindrical shell between each adjacent said fixing claws, said guide wall extending axially beyond said fixing claw;

wherein said fixing claws are thermally deformed in a radial direction so as to grasp an outer periphery of said lens element, thereby fixing said lens element to said plastic lens holder.

4. A plastic lens holder as defined in claim 3, wherein said guide wall is formed with a tapered edge for guiding said lens element toward said axis of said cylindrical shell.

5. A plastic lens holder as defined in claim 3, and further comprising grooves formed in said cylindrical shell for allowing access of a removing tool to an under side of said lens element for removal of said lens element from said lens holder.

* * * * *